United States Patent [19]
Hilgendorf

[11] Patent Number: 5,522,471
[45] Date of Patent: Jun. 4, 1996

[54] KNOCKDOWN CART CONVERTIBLE INTO MODULAR SHIPPING CONTAINER

[76] Inventor: Dennis J. Hilgendorf, 1655 Washington Rd., Stoughton, Wis. 53589

[21] Appl. No.: 236,172

[22] Filed: May 2, 1994

[51] Int. Cl.[6] .......................... B62D 51/04; B62D 61/06; B65D 6/24
[52] U.S. Cl. .................. 180/208; 180/214; 180/19.2; 280/30; 220/1.5; 220/4.28
[58] Field of Search .................................. 180/208, 214, 180/213, 211, 19.2, 19.3, 65.5; 280/30, 638, 43.12; 220/4.28, 4.33, 1.5

[56] References Cited

U.S. PATENT DOCUMENTS

| | | | |
|---|---|---|---|
| 288,662 | 11/1883 | Reed | 280/30 |
| 873,711 | 12/1907 | Bruen | 180/208 |
| 1,828,684 | 10/1931 | Scarlett | 220/4.28 |
| 3,308,974 | 3/1967 | Rosenbaum | 180/211 |
| 3,423,101 | 1/1969 | Boeye | 280/43.12 |
| 3,734,525 | 5/1973 | Rimbey | 280/30 |
| 3,854,544 | 12/1974 | Kolchev | 180/19.2 |
| 5,249,821 | 10/1993 | Ricketts et al. | 280/638 |

*Primary Examiner*—Margaret A. Focarino
*Assistant Examiner*—Peter C. English
*Attorney, Agent, or Firm*—Keith Schoff

[57] ABSTRACT

A power operated wheeled cart for hauling bulk materials is constructed so that it can be knocked-down into a condition of partial disassembly in a manner such that a base platform can be inverted and used as a structural base for attaching crating members to form a compact modular shipping unit which utilizes a minimum of crating components.

3 Claims, 4 Drawing Sheets

KNOCKDOWN CART CONVERTIBLE INTO MODULAR SHIPPING CONTAINER

FIELD OF ART

Manufactured goods are desirably packaged or crated for shipping in a compact form which renders them suitable for use both with common material handling equipment such as fork lift trucks and as containerized cargo carded in standardized shipping containers.

BACKGROUND OF INVENTION

Power operated carts are used for numerous agricultural, commercial, and industrial tasks to move bulk materials or heavy cargo.

SUMMARY OF THE INVENTION

An electric powered cart similar in material respects to that disclosed in U.S. Pat. No. 3,308,974, to Rosenbaum is configured and assembled in a manner which enables the superstructure, electric storage batteries, and steering gear including the wheel and affixed electric motor and gearbox, to be removed from the platform base of the cart. The base can then be inverted to provide a structural bottom for a shipping crate. Crating cross-boards are bolted to extend below opposite ends of the base, uprights are added at the corners, and top boards extending between the top of the uprights complete the skeleton of a crate containing a knocked-down cart. Corner reinforcing is desirably added to strengthen the structure for shipping, and in a preferred embodiment a protective barrier is added to laterally project from an end of the crate to shield the steering gear which extends beyond the face of the skeleton structure.

DESCRIPTION OF AN EMBODIMENT OF THE INVENTION

Figure 1:
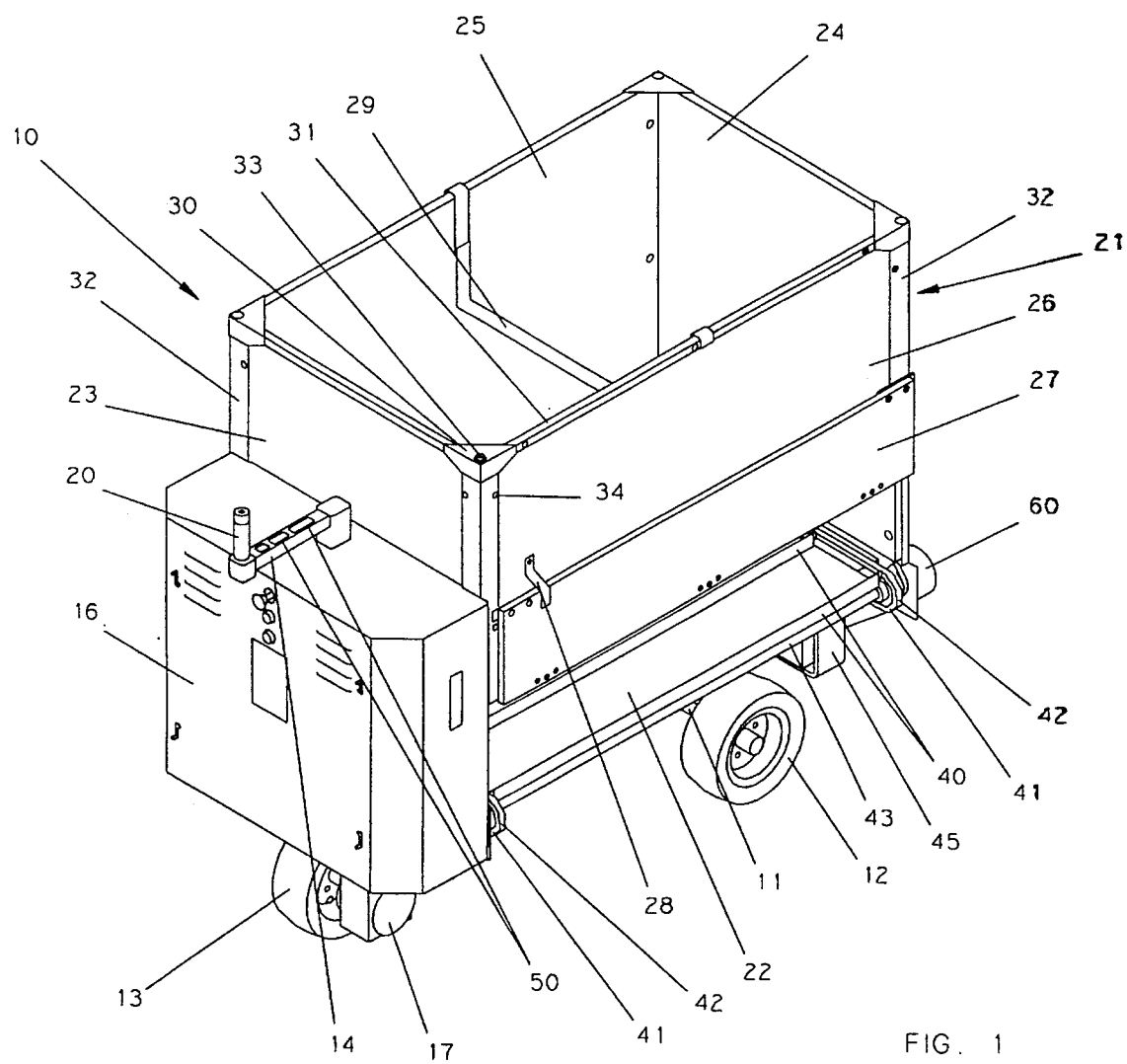
FIG. 1 is a perspective view of a cart described herein in fully assembled condition.

In FIG. 1, cart 10 is a three-wheeled vehicle with rear axle 11 mounting wheels 12, 12', one at each end, with the latter wheel obscured from view. Front wheel 13, mounted at the center front of cart 10, is steered by manually rotating tiller arm 14 about the axis of vertical steering column 15, which is concealed from view behind front enclosure 16 of cart 10. Direct-current electric drive motor 17 with integrally housed reduction gearing is mounted to turn unitarily with wheel 13 under steering control tiller arm 14. Control handle 20 for operating motor 17 is mounted upright at the outboard end of tiller arm 14. Other means than tiller portion 14, such as a steering wheel, may be provided for steering 13, but a tiller arm is preferred.

Cargo box 21 is constructed with floor 22, removable front and rear panels 23 and 24, respectively, right side panel 25, and left side panel 26, with the latter being constructed with hinged lower door 27, as shown in open position retained by latch 28. The panels are preferably constructed of high density overlay plywood for durability. Triangular top corner reinforcements 32 preferably comprise metal angles which are bolted together by bolts 33 with the panels being secured by bolts 34 as well. The base edge of the panels are similarly bolted and screwed to tabs 63 (shown in FIG. 2) by means concealed from view in FIG. 1. The four panels are bolted together in a manner such that each can be detached from another and from tabs 63 during disassembly quickly, and similarly can be quickly reassembled.

Conveyor bars 40 are carded at each end by endless chains 41 mounted on sprockets 42. Sprockets 42 are mounted on shaft 43 driven by chain 60 from drive motor 44 (FIG. 2) mounted on bracket 45 beneath floor 22 of cart 10. The conveyor unloads bulk cargo from cargo box 21 through the side opening which is created by opening lower door 27 of side panel 26, as shown. Drive motor 44 actuation is controlled by switches 50 on tiller arm 14. Similarly, selection of forward, reverse drive and speed selection of motor 17 is controlled by switches 50 on tiller arm 14, with actuation, and of motor 17 being accomplished preferably by vertical movement of a sleeve cover on control handle 20. Bulk material anti-bridging member 29 is shown spanning the side walls of cargo box 21 in FIG. 1. Electric storage batteries and electrical control apparatus is mounted in front of cargo box 21 concealed from view by front enclosure 16.

Figure 2:
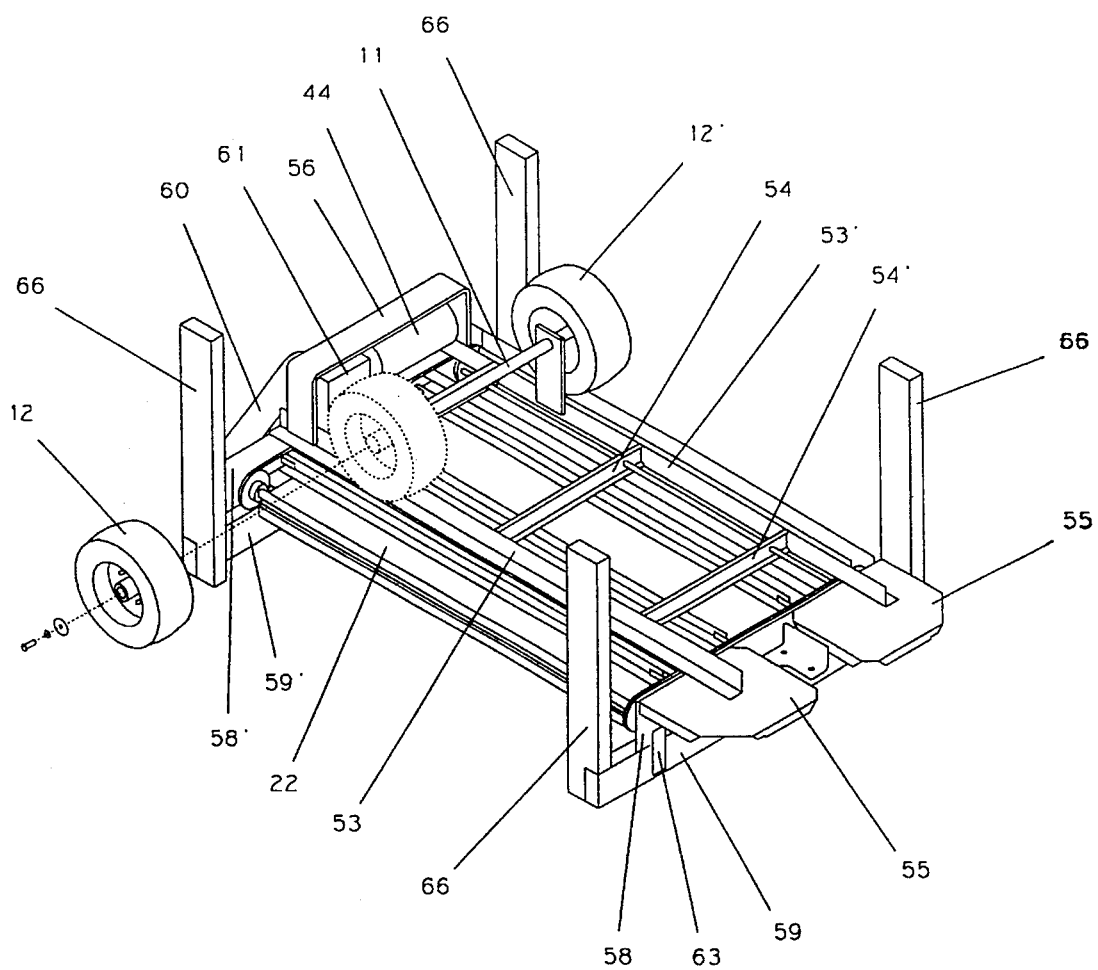
FIG. 2 is a partially exploded perspective view of a disassembled cart with base platform inverted to form the structural base of a shipping unit with crate cross-members and uprights added.
Figure 3:
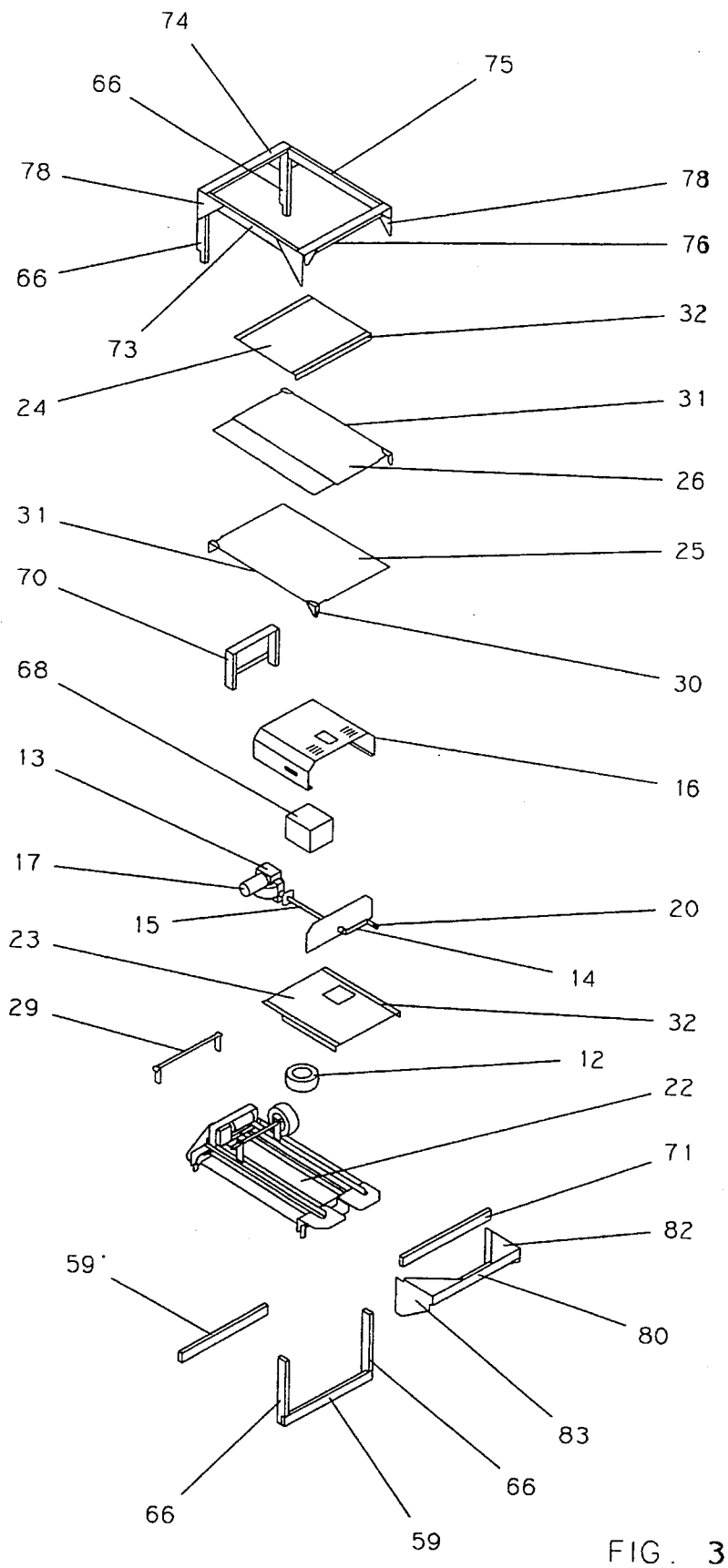
FIG. 3 is an exploded perspective view of a shipping unit of this invention.
Figure 4:
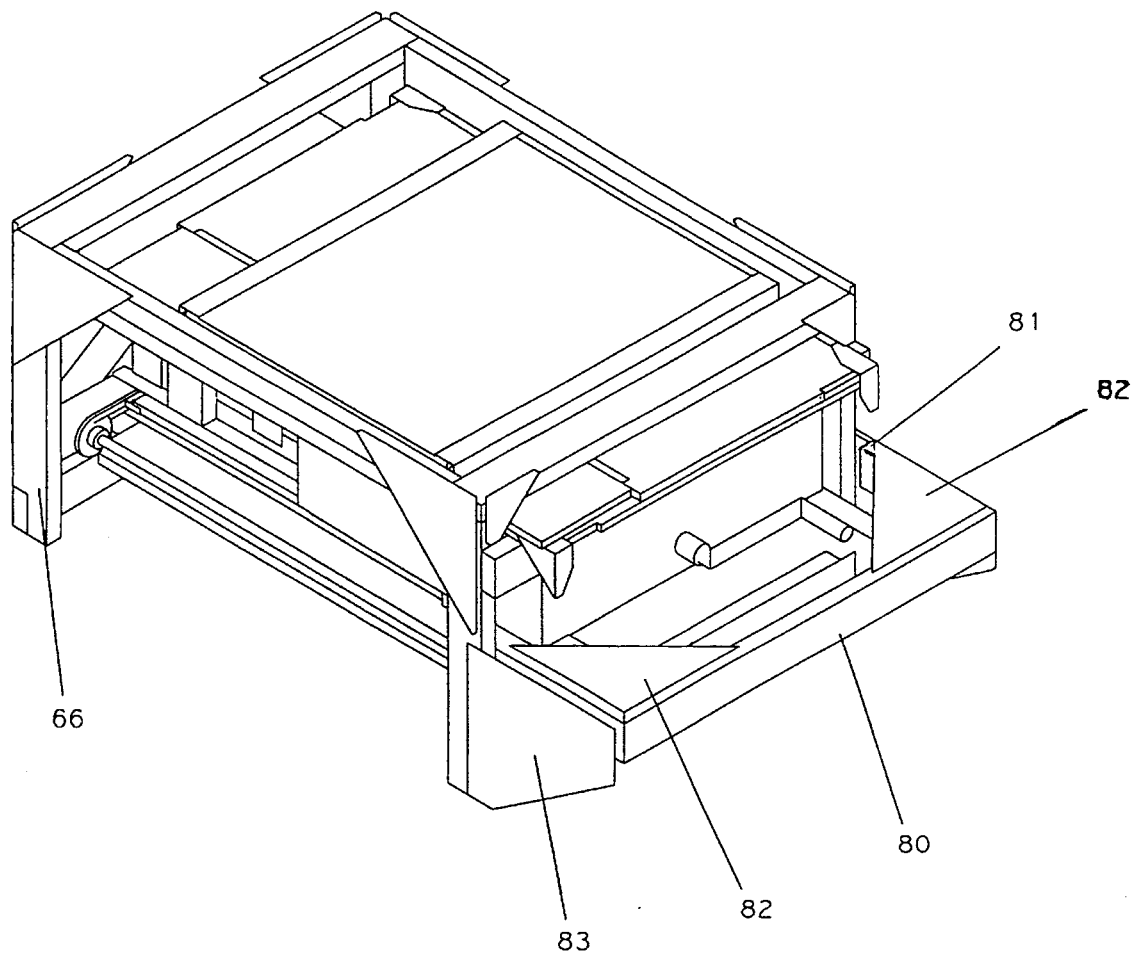
FIG. 4 is a perspective view of a shipping unit of this invention.

FIG. 2 shows floor 22 of cart 10 inverted with wheels 12, 12' uppermost, however, wheel 12, shown only in phantom line portrayal as mounted on axle 11, is removed from the end of the axle for shipping. Rigid frame members 53, 53' running longitudinally of cart 10 are welded to cross-bracing members 54, 54' and to storage battery carriers 55, 55' at the front of the cart, and to motor 44 carder bracket 56 at the rear of the cart. Plates 58, 58' carrying sprockets 42 on which conveyor chains 41 are mounted are also secured unitarily to frame members 53, 53'. One of sprockets 42 is driven by chain 60 from drive motor 44 which is equipped with associated reduction gearing 61, as shown. Metal plate connector 63, only one of which is shown in FIG. 2 with others being concealed from view, are welded to plates 58, 58' and bolted to crating cross-boards 59, 59' to secure the cross-boards under cart floor 22. Cross-boards 59, 59' extend below the bottom of floor 22 and attached conveyor to provide feet upon which the crate rests, and may also be provided with additional pallet openings, not shown, through which tines of a fork lift vehicle can be inserted for lifting and transporting the crate in any direction. Crating upright boards 66 are attached to the ends of cross-boards 59, 59' as shown in FIG. 2. As shown in FIG. 3, components of cart 10 are stacked on inverted floor 22 base of the shipping crated in the order shown in exploded view. Wheel 12 and reinforcing member are placed on floor 22 base of the crate, with front panel 23 placed on top of them. The anti-bridging member 29 is fastened to the motor brackets 56. The cart drive unit comprising tiller arm 14, control handle 20, steering column 15, steered drive wheel 13 and integral direct drive motor and gearbox 17 is placed on top of panel 23 with the upper end of the drive unit including tiller arm 14 and handle 20 projecting beyond the vertical end plane in which crate cross-board 59 lies. Battery charger 68 is placed beside steering column 15 and front enclosure 16 is placed over the cart drive unit and battery charger in nested arrangement. Rear support crating member 70 and front crating cross board 71 are secured to other crating members to support right side panel 25, while preventing contact between right side panel 25 and enclosure 16. Left side panel 26 and rear panel 24 are placed on top of panel 25. Top crating boards 73, 74, 75, and 76 are provided and fastened to the tops of crating upright boards 66. Crating top corner wooden gussets 78 preferably extend as shown in FIG. 3 slightly above the top crating boards to provide a frame in which another identical crate can be stacked and nested for shipment, the arrangement being particularly advantageous when shipment is made in a unitized freight container. Top corner and edge reinforcements 30, 31, are preferably attached to side panels 25, 26 prior to shipment as shown in FIG. 3, and side corner reinforcements 32 are attached to front and rear panels 23, 24, also as shown in FIG. 3. Protective crating board 80 is carried by stand-off members 81 from crating upright boards 66 to provide a protective barrier for tiller arm 14 and control handle 20. Wooden gussets 83, 82 are provided to strengthen the protective structure with the assembly being secured to crating upright boards 66. FIG. 4 shows a completely crated cart 10 ready for shipment. The crated cart occupies a minimum of cargo space and utilizes a minimum of crating materials, thereby effecting an economical and efficient shipping unit.

I claim:

1. A modular shipping crate for a knocked-down cart which, in assembled condition, embodies a rigid base frame, wheels supporting said frame, steering means for at least one said wheel, motive power means, and detachably connected wall panels forming a cargo space for carrying load, comprising a) a shipping crate base member comprising said base frame in inverted position, b) crating cross-members extending along at least two opposite outboard portions of said frame, and fastened to be unitary therewith, c) crating upright members extending upwardly from said cross members, and fastened to be unitary therewith, d) crating top members extending between the tops of said upright members, and fastened to be unitary therewith, e) said steering means, wall panels, certain of said wheels, and other components of said cart in stacked, disassembled arrangement on said base member with said wall panels being coplanar with said base member.

2. The crate of claim 1 in which said steering means comprises a tiller extending from a mounting post for a steering wheel and wherein said tiller is protected in said shipping crate by a barrier projecting laterally from one upright face of said crate, defined as a plane in which the outer faces of two of said upright members lie.

3. The crate of claim 1 in which said steering means comprises a motive power unit mounted to move unitarily with steering motion of said one wheel and wherein said steering means is stacked atop said crate base member with a portion thereof extending laterally beyond a plane in which the outer faces of two of said upright members lie.

* * * * *